(12) United States Patent
Sanami et al.

(10) Patent No.: US 9,846,044 B2
(45) Date of Patent: Dec. 19, 2017

(54) TRAVEL INFORMATION RECORDING SYSTEM, METHOD, AND PROGRAM

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Kenta Sanami, Kuwana (JP); Satoshi Hirano, Obu (JP); Takayuki Miyajima, Anjo (JP); Tomoki Kodan, Nagoya (JP); Kuniaki Tanaka, Nagoya (JP)

(73) Assignees: AISIN AW CO., LTD., Anjo-shi (JP); TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 15/021,368

(22) PCT Filed: Aug. 18, 2014

(86) PCT No.: PCT/JP2014/071576
§ 371 (c)(1),
(2) Date: Mar. 11, 2016

(87) PCT Pub. No.: WO2015/040992
PCT Pub. Date: Mar. 26, 2015

(65) Prior Publication Data
US 2016/0223344 A1  Aug. 4, 2016

(30) Foreign Application Priority Data

Sep. 20, 2013 (JP) .................................. 2013-195189

(51) Int. Cl.
*G01C 21/26* (2006.01)
*G01C 21/30* (2006.01)
*B60L 3/12* (2006.01)

(52) U.S. Cl.
CPC ................ *G01C 21/26* (2013.01); *B60L 3/12* (2013.01); *G01C 21/30* (2013.01);
(Continued)

(58) Field of Classification Search
CPC ...... G01C 21/26; G01C 21/30; G08G 1/0112; B60L 3/12
See application file for complete search history.

(56) References Cited

U.S. PATENT DOCUMENTS

2006/0217884 A1* 9/2006 Adachi .................. G01C 21/30
701/414
2007/0112475 A1* 5/2007 Koebler .................... B60L 3/12
701/1

(Continued)

FOREIGN PATENT DOCUMENTS

JP  2008-241474 A   10/2008
JP  2008233015 A  * 10/2008

(Continued)

OTHER PUBLICATIONS

JPO machine translation of JP 2008-233015 A (original JP document published Oct. 2, 2008).*

(Continued)

*Primary Examiner* — Behrang Badii
*Assistant Examiner* — David Testardi
(74) *Attorney, Agent, or Firm* — Sughrue Mion, PLLC

(57) ABSTRACT

A travel information recording system for associating travel information on a vehicle obtained immediately after travel through a branch location with an appropriate road segment includes: travel segment specifying unit for specifying a travel segment that is a road segment in which a vehicle is traveling; and travel information recorder for recording travel information on the vehicle obtained during travel in the travel segment in association with the travel segment in (Continued)

a storage medium. In the case where there occurs a segment variation in which the travel segment is varied from one of several road segments branched off from a branch location, the travel information recorder acquires the travel information to be recorded in association with a post-variation segment, which is the travel segment after the segment variation, on the basis of the travel information obtained before the segment variation.

14 Claims, 3 Drawing Sheets

(52) U.S. Cl.
CPC ....... *B60L 2240/12* (2013.01); *B60L 2240/16* (2013.01); *B60L 2240/20* (2013.01); *B60L 2240/622* (2013.01); *B60L 2240/645* (2013.01); *Y02T 10/7291* (2013.01); *Y02T 90/16* (2013.01); *Y02T 90/161* (2013.01); *Y02T 90/162* (2013.01)

(56) References Cited

U.S. PATENT DOCUMENTS

| | | | | |
|---|---|---|---|---|
| 2007/0150185 | A1* | 6/2007 | Nagase | G01C 21/30 701/422 |
| 2007/0294023 | A1* | 12/2007 | Arcot | G08G 1/0104 701/117 |
| 2008/0119982 | A1* | 5/2008 | Yamada | B60L 3/12 701/33.4 |
| 2008/0262668 | A1* | 10/2008 | Yamada | B60K 6/46 701/22 |
| 2008/0316060 | A1* | 12/2008 | Sewaki | G01C 21/30 340/995.25 |
| 2009/0005958 | A1* | 1/2009 | Roesser | G08G 1/20 701/117 |
| 2011/0060495 | A1* | 3/2011 | Kono | B60W 40/072 701/31.4 |
| 2012/0128213 | A1* | 5/2012 | Satoh | G01C 21/30 382/113 |
| 2012/0143886 | A1* | 6/2012 | Okude | G01C 21/32 707/756 |
| 2012/0209507 | A1 | 8/2012 | Serbanescu | |
| 2015/0066270 | A1* | 3/2015 | Ogawa | B60W 20/00 701/22 |

FOREIGN PATENT DOCUMENTS

| | | | |
|---|---|---|---|
| JP | 200964205 | A | 3/2009 |
| JP | 2009064205 | A * | 3/2009 |
| JP | 2011-016465 | A | 1/2011 |
| JP | 2012-159367 | A | 8/2012 |
| JP | 2012159367 | A * | 8/2012 |
| WO | 2013/132593 | A1 | 9/2013 |
| WO | WO 2013/132593 | A1 * | 9/2013 |

OTHER PUBLICATIONS

JPO machine translation of JP 2009-064205 A (original JP document published Mar. 26, 2009).*
International Search Report of PCT/JP2014/071576 dated Nov. 18, 2014 [PCT/ISA/210].
Communication dated May 19, 2016 from the European Patent Office in counterpart application No. 14846704.6.

* cited by examiner

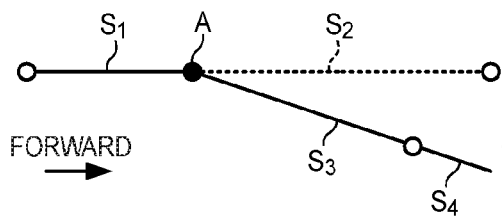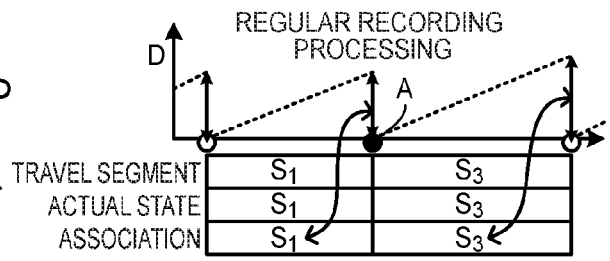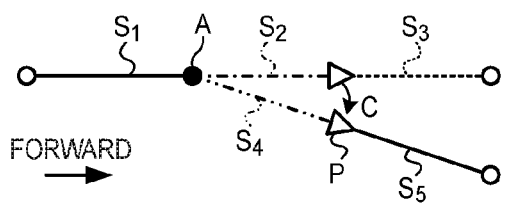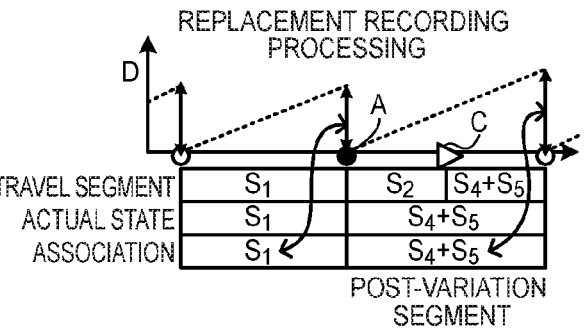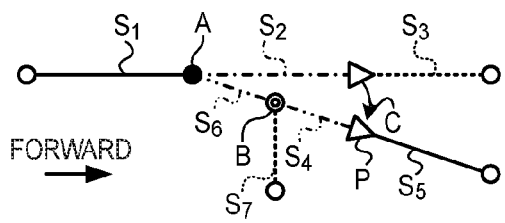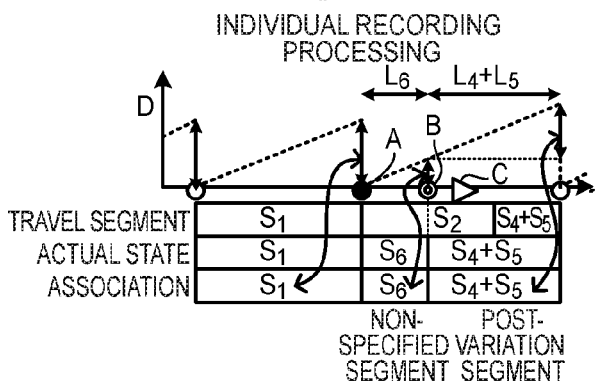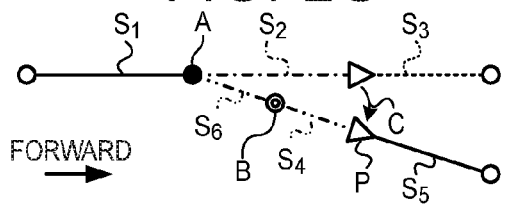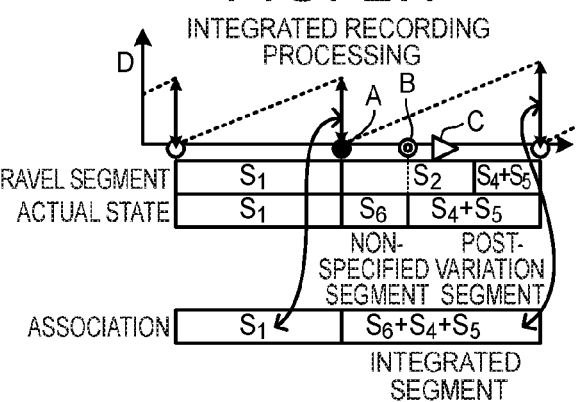

TRAVEL INFORMATION RECORDING SYSTEM, METHOD, AND PROGRAM

CROSS REFERENCE TO RELATED APPLICATIONS

This application is a National Stage of International Application No. PCT/JP2014/071576, filed Aug. 18, 2014, claiming priority based on Japanese Patent Application No. 2013-195189, filed Sep. 20, 2013, the contents of all of which are incorporated herein by reference in their entirety.

TECHNICAL FIELD

The present disclosure relates to a travel information recording system, method, and program that records travel information on a vehicle in association with a road segment.

BACKGROUND ART

There is known a technology for recording the speed and the acceleration of a vehicle in association with each road traveled by the vehicle (see Patent Document 1). The technology allows acquisition of the speed and the acceleration of the vehicle in the past for each road.

RELATED-ART DOCUMENTS

Patent Documents

[Patent Document 1] Japanese Patent Application Publication No. 2011-16465 (JP 2011-16465 A)

SUMMARY

In the case where the road on which the vehicle is traveling cannot be accurately specified, however, the speed and the acceleration of the vehicle cannot be appropriately recorded in association with the road. For example, in the case where the directions of a plurality of roads connected to a certain branch location are similar to each other, the road on which the vehicle is traveling cannot be accurately specified by a map matching technique immediately after travel through the branch location. Thus, the speed and the acceleration of the vehicle obtained immediately after travel through the branch location may be associated with an inappropriate road.

The present disclosure has been made in view of the foregoing issue, and therefore has an object to provide a technology for associating travel information on a vehicle obtained immediately after travel through a branch location with an appropriate road segment.

In order to achieve the foregoing object, the present disclosure provides a travel information recording system including: travel segment specifying unit for specifying a travel segment that is a road segment in which a vehicle is traveling; and travel information recorder for recording travel information on the vehicle obtained during travel in the travel segment in association with the travel segment in a storage medium. In the case where there occurs a segment variation in which the travel segment is varied from one of a plurality of road segments branched off from a branch location, the travel information recorder acquires the travel information to be recorded in association with a post-variation segment, which is the travel segment after the segment variation, on the basis of the travel information obtained before the segment variation.

In order to achieve the foregoing object, the present disclosure also provides a travel information recording method for causing a computer to perform: a travel segment specifying step of specifying a travel segment that is a road segment in which a vehicle is traveling; and a travel information recording step of recording travel information on the vehicle obtained during travel in the travel segment in association with the travel segment in a storage medium, in which the travel information recording step includes, in the case where there occurs a segment variation in which the travel segment is varied from one of a plurality of road segments branched off from a branch location, acquiring the travel information to be recorded in association with a post-variation segment, which is the travel segment after the segment variation, on the basis of the travel information obtained before the segment variation.

In order to achieve the foregoing object, the present disclosure further provides a travel information recording program that causes a computer to implement: a travel segment specifying function of specifying a travel segment that is a road segment in which a vehicle is traveling; and a travel information recording function of recording travel information on the vehicle obtained during travel in the travel segment in association with the travel segment in a storage medium, in which in the case where there occurs a segment variation in which the travel segment is varied from one of a plurality of road segments branched off from a branch location, the travel information recording function causes the computer to acquire the travel information to be recorded in association with a post-variation segment, which is the travel segment after the segment variation, on the basis of the travel information obtained before the segment variation.

A travel segment specified by performing map matching over a long time and a long distance from travel through the branch location has a higher degree of reliability than that of a travel segment specified immediately after travel through the branch location. Thus, in the case where a segment variation occurs after travel through the branch location, the post-variation segment which is specified after the segment variation has a higher degree of reliability as a travel segment than that of a travel segment specified before the segment variation. That is, it can be considered that before the segment variation, the vehicle was traveling in the post-variation segment, which is the travel segment after the segment variation, rather than the travel segment before the segment variation, and that the travel information obtained before the segment variation is travel information obtained by the vehicle traveling in the post-variation segment. Thus, the travel information recorder can associate the travel information on the vehicle with an appropriate road segment by acquiring travel information to be associated with the post-variation segment on the basis of the travel information obtained before the segment variation. The branch location is a location from which the vehicle can exit to a plurality of road segments in the case where the vehicle enters the branch location from a certain road segment.

BRIEF DESCRIPTION OF THE DRAWINGS

FIGS. 2A, 2C, 2E, and 2G are each a schematic diagram illustrating road segments, and FIGS. 2B, 2D, 2F, and 2H are each a schematic diagram illustrating the relationship between a power integral value and the road segments.

An exemplary embodiment will be described below in the following order:
(1) Configuration of Navigation System
   (1-1) Regular Recording Processing
   (1-2) Replacement Recording Processing
   (1-3) Individual Recording Processing
   (1-4) Integrated Recording Processing
   (1-5) Drive Assist
(2) Travel Information Recording Processing
(3) Other Embodiments
   (1) Configuration of Navigation System FIG. 1 is a block diagram illustrating the configuration of a travel information recording system mounted on a vehicle. In the embodiment, the travel information recording system is implemented by a navigation system 10. The navigation system 10 includes a control section 20 including a CPU, a RAM, a ROM, and so forth. The control section 20 executes programs stored in the ROM. In the embodiment, a navigation program can be executed as one of the programs. The navigation program is a program that causes the control section 20 to implement a function of displaying a map including the current position of the vehicle on a display section of the navigation system 10 to guide a driver along a planned travel route to a destination location. The navigation program includes various types of programs utilized during travel. In the embodiment, the navigation program includes a travel information recording program 21 for recording travel information on the vehicle for each road segment traveled by the vehicle.

Figure 1:
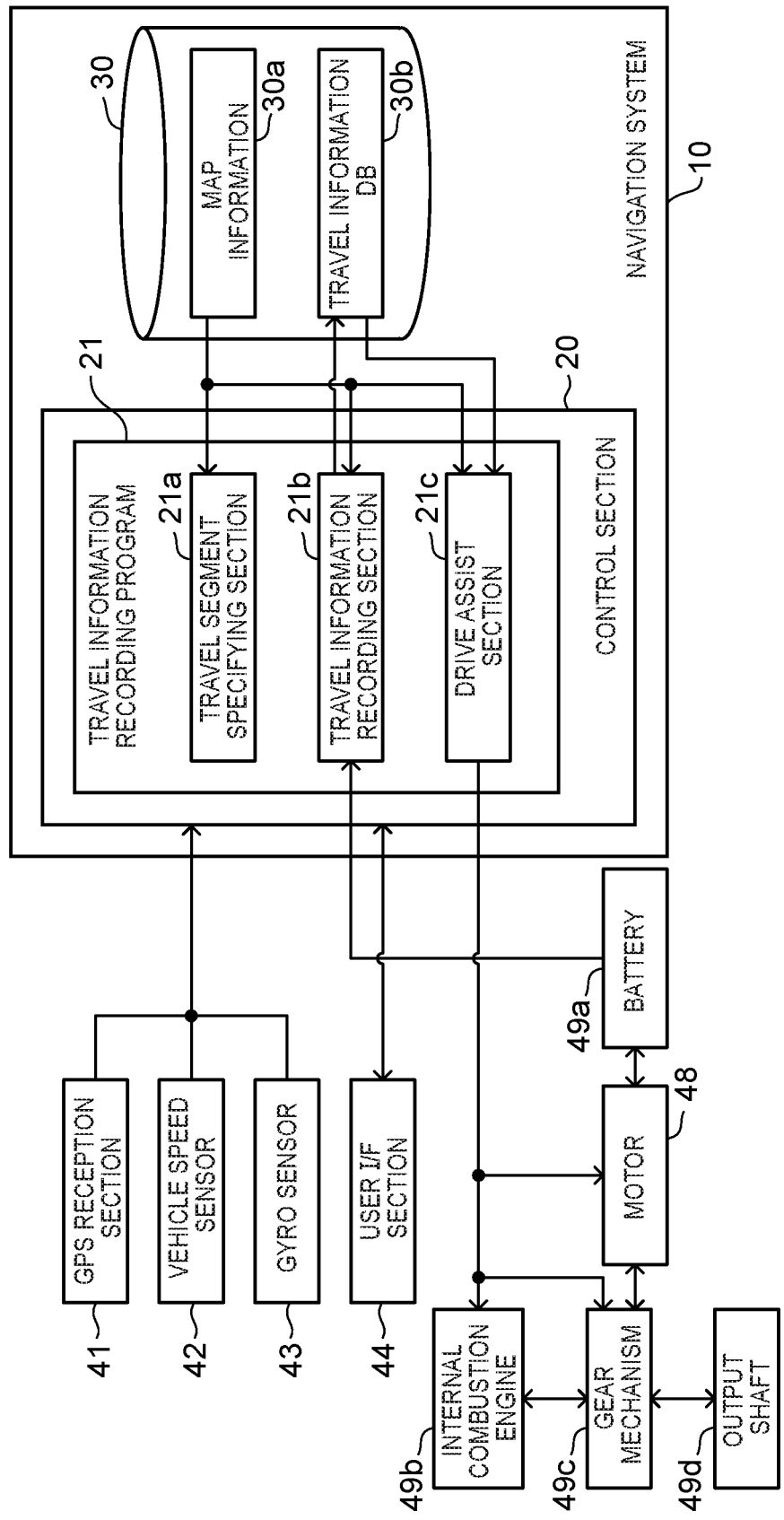
FIG. 1 is a block diagram illustrating a navigation system that includes a travel information recording system.

A storage medium 30 stores map information 30a. In addition, a travel information database (DB) 30b is stored in the storage medium 30 during travel of the vehicle. The map information 30a includes node data indicating the position etc. of nodes corresponding to the terminal points (start point and end point) of road segments traveled by the vehicle, shape interpolation point data indicating the position etc. of shape interpolation points for specifying the shape of the road segments between the nodes, link data indicating connection between the nodes, and so forth. The link data include information indicating the road type of the road segment, information indicating the segment length which is the length of the link, and information indicating the travel direction of the vehicle on the link. Of the terminal points of a road segment, the terminal point located forward in the travel direction of the vehicle corresponds to the end point of the road segment. In addition, terminal points to which three or more road segments are connected constitute branch locations and intersections. In the embodiment, the road type means the distinction between a general road and a highway.

Furthermore, the travel information DB 30b is stored in the storage medium 30 during operation of the travel information recording program 21. The travel information DB 30b is a database that stores travel information on the vehicle obtained in each road segment traveled by the vehicle in association with the road segment. In the embodiment, a power integral value indicating the integral value of power consumed in a period in which the vehicle travels in a road segment is accumulated in the travel information DB 30b as the travel information. The power integral value is a value of power consumed by a battery 49a acquired for each constant travel distance, integrated in a period in which the vehicle travels in a road segment.

The vehicle according to the embodiment includes a GPS reception section 41, a vehicle speed sensor 42, a gyro sensor 43, a user I/F section 44, the battery 49a, an internal combustion engine 49b, a gear mechanism 49c, an output shaft 49d, a motor 48, and an ECU 50. The vehicle according to the embodiment is a hybrid vehicle driven with a rotational drive force of the internal combustion engine 49b and the motor 48 transferred to the output shaft 49d by the gear mechanism 49c. The distribution of energy transferred from the internal combustion engine 49b and the motor 48 to the output shaft 49d is adjusted by the gear mechanism 49c on the basis of a control signal generated by the ECU 50. The power integral value as the travel information to be accumulated in the travel information DB 30b according to the embodiment is a value (corresponding to power consumption) obtained by integrating power consumed by the battery 49a at each time in the case where the vehicle is driven by the motor 48 with the internal combustion engine 49b stationary (so-called EV travel).

The GPS reception section 41 receives radio waves from GPS satellites to output a signal for calculating the current position of the vehicle via an interface (not illustrated). The control section 20 acquires the signal to acquire the current position of the vehicle. The vehicle speed sensor 42 outputs a signal corresponding to the rotational speed of wheels of the vehicle. The control section 20 acquires the signal via an interface (not illustrated) to acquire the vehicle speed. The gyro sensor 43 detects the angular acceleration of gyration of the vehicle in a horizontal plane to output a signal corresponding to the direction of the vehicle. The control section 20 acquires the signal to acquire the direction of travel of the vehicle.

The user I/F section 44 is an interface section that receives input of a command from the driver and that provides various kinds of information to the driver, and includes a display section constituted of a touch panel display (not illustrated), an input section such as a switch, and a sound output section such as a speaker. The user I/F section 44 receives a control signal from the control section 20, and displays an image for providing various types of guidance on the touch panel display.

The travel information recording program 21 includes a travel segment specifying section 21a, a travel information recording section 21b, and a drive assist section 21c.

The travel segment specifying section 21a is a module that causes the control section 20 to execute a function of specifying a travel segment that is a road segment in which the vehicle is traveling. Specifically, through the function of the travel segment specifying section 21a, the control section 20 acquires a track of travel of the vehicle, and references the map information 30a to acquire the road shape of a road segment that is present around the vehicle. The control section 20 acquires a degree of confidence that matches the degree of coincidence between the track of travel of the vehicle and the road shape for each road segment, and specifies a road segment with the highest degree of confidence as the travel segment. In the embodiment, the control section 20 acquires a track of travel by correcting an autonomous navigation track, which is a track based on an output signal from the gyro sensor 43 and the vehicle speed sensor 42, on the basis of a GPS track, which is a track of the position of the vehicle specified on the basis of GPS signals, or the like (see Japanese Patent Application Publication No. 2012-7939 (JP 2012-7939 A)). When a travel segment is specified, through the function of the travel segment specifying section 21a, the control section 20 specifies the current position of the vehicle in the travel segment. For example, the control section 20 may specify, as the current position of the vehicle, a location that is the closest to the most recent location in the track of travel of the vehicle, among locations in the travel segment.

The travel information recording section 21b is a module that causes the control section 20 to execute a function of recording travel information on the vehicle obtained when the vehicle travels in a travel segment in the travel information DB 30b of the storage medium 30 in association with the travel segment. Through the function of the travel information recording section 21b, the control section 20 switchably executes regular recording processing, replacement recording processing, integrated recording processing, and individual recording processing. Through the function of the travel information recording section 21b, the control section 20 executes recording processing (one of the regular recording processing, the replacement recording processing, the integrated recording processing, and the individual recording processing), in which the travel information acquired beforehand is recorded in the travel information DB 30b, at the timing when the vehicle completes travel in a travel segment. Completion of travel in a travel segment may be achieved when the vehicle has traveled through a location within a predetermined distance (e.g. 5 m) from the end point of the travel segment.

(1-1) Regular Recording Processing

First, the regular recording processing will be described. Through the function of the travel information recording section 21b, the control section 20 acquires power consumed by the battery 49a for each constant travel distance (e.g. 10 m) during travel of the vehicle, integrates the consumed power to acquire a power integral value, and records the power integral value in the RAM. In the regular recording processing, when travel in the travel segment is completed, through the function of the travel information recording section 21b, the control section 20 records the power integral value integrated during travel in the travel segment in the travel information DB 30b in association with the travel segment. When travel in the travel segment is completed, the control section 20 resets the power integral value recorded in the RAM to zero, and consecutively records a power integral value obtained in the next travel segment in the RAM.

FIG. 2A is a schematic diagram illustrating the travel state of the vehicle for a case where the regular recording processing is executed. FIG. 2B is a schematic diagram illustrating the power integral value recorded in the regular recording processing. In FIG. 2A, nodes corresponding to the terminal points of road segments are indicated by circles, with a branch location A particularly indicated by a black circle. FIG. 2A illustrates a state in which road segments $S_2$ and $S_3$ are connected to the branch location A which is the end point of a road segment $S_1$ in the case where the vehicle travels rightward on the drawing sheet. It is assumed that a road segment $S_4$ is connected to the road segment $S_3$ which is connected to the branch location A.

TABLE 1

| LINE TYPE OF LINK | ACTUALLY TRAVELED | SPECIFIED AS TRAVEL SEGMENT |
|---|---|---|
| ———— | YES | YES |
| —·—·— | NO | YES |
| —··—··— | YES | NO |
| ·········· | NO | NO |

The lines indicated in FIG. 2A (and FIGS. 2C, 2E, and 2G) represent road segments (including a part of a road segment). The relationship between the line type of each line and the characteristics of the road segments is indicated in Table 1. That is, the solid lines represent road segments actually traveled by the vehicle and specified as travel segments. The dash-and-dot lines indicate road segments not actually traveled by the vehicle but specified as travel segments. The dash-double-dot lines indicate road segments actually traveled by the vehicle but not specified as travel segments. The broken lines indicate road segments not actually traveled by the vehicle and not specified as travel segments. FIG. 2B (and FIGS. 2D, 2F, and 2H) are each a schematic diagram illustrating the relationship between a power integral value D and road segments S corresponding to the power integral value D. In the graphs of the drawings, the vertical axis indicates the power integral value D, and the horizontal axis indicates the position of the vehicle. As indicated by the broken lines in FIG. 2B, the power integral value D is integrated as the vehicle travels.

In FIG. 2A, it is assumed that the vehicle actually sequentially travels in the road segments S1, S3, and S4, and that the road segments S1, S3, and S4 are sequentially specified as travel segments. When the vehicle travels through the branch location A, the control section 20 resets the power integral value D accumulated in the RAM to zero, and integrates the power integral value D in a period in which the vehicle travels in the road segment S3. Next, when travel in the road segment S3, which is specified as the travel segment, is completed, the control section 20 records the power integral value D accumulated in the RAM in the travel information DB 30b in association with the road segment S3. In the case of FIG. 2A, the road segment S3 is specified as the travel segment in a period in which the vehicle actually travels in the road segment S3. Therefore, as illustrated in FIG. 2B, the control section 20 records the power integral value D as it is in the travel information DB 30b in association with the road segment S3.

As described above, in the case where the road segment S in which the vehicle is actually traveling and the road segment S specified as the travel segment coincide with each other, the control section 20 records the power integral value D in association with the road segment S specified as the travel segment through the regular recording processing. Depending on the status of map matching, however, it is occasionally estimated that the road segment S in which the vehicle is actually traveling and the road segment S specified as the travel segment do not coincide with each other. In such a case, one of the replacement recording processing, the integrated recording processing, and the individual recording processing to be discussed later is executed rather than the regular recording processing.

(1-2) Replacement Recording Processing

Next, the replacement recording processing will be described. In the replacement recording processing, in the case where there occurs a segment variation C in which the travel segment is varied from one of the plurality of road segments S branched off from the branch location A, through the function of the travel information recording section 21b, the control section 20 acquires the power integral value D to be recorded in the travel information DB 30b in association with a post-variation segment, which is the travel segment after the segment variation C, on the basis of the power integral value D obtained before the segment variation C. The case where there occurs a segment variation C means a case where it is estimated that the road segment S in which the vehicle is actually traveling and the road segment specified as the travel segment do not coincide with each other.

FIG. 2C is a schematic diagram illustrating the travel state of the vehicle for a case where the replacement recording processing is executed. FIG. 2D is a schematic diagram illustrating the power integral value D recorded in the replacement recording processing. In FIG. 2C, the vehicle actually sequentially travels in the road segments $S_1$ and $(S_4+S_5)$. The road segment $(S_4+S_5)$ is a single road segment S, and is composed of a first portion $S_4$ and a second portion $S_5$. In FIG. 2C, immediately after the vehicle travels through the branch location A, the road segment $S_2$ is erroneously specified as the travel segment although the vehicle is actually traveling in the road segment $(S_4+S_5)$. After the road segment $S_2$ is continuously erroneously specified as the travel segment, the road segment $(S_4+S_5)$ in which the vehicle is actually traveling is specified as the travel segment. That is, in the case of FIG. 2C, there occurs a segment variation C in which the travel segment is varied from the road segment $S_2$, which is one of the plurality of road segments S branched off from the branch location A, to the road segment $(S_4+S_5)$.

In the embodiment, through the function of the travel information recording section 21b, the control section 20 determines that a segment variation C has occurred in the case where a current position P of the vehicle specified in the travel segment discontinuously transitions. The condition under which it is determined that the current position P discontinuously transitions may be that the amount of movement of the current position P per unit time is a predetermined distance or more, or that the direction of movement of the current position P makes a predetermined angle or more with respect to the direction of a link of the travel segment (the travel segment before the segment variation C or/and the travel segment after the segment variation C). The road segment $(S_4+S_5)$, which is specified as the travel segment after the segment variation C, corresponds to the post-variation segment. The post-variation segment $(S_4+S_5)$ is composed of a first portion $S_4$ (dash-double-dot line), in which the vehicle was actually traveling before the segment variation C, and a second portion $S_5$ (solid line), in which the vehicle was actually traveling after the segment variation C.

In the case where it is determined that a segment variation C has occurred, through the function of the travel information recording section 21b, the control section 20 determines whether or not the branch location A and the post-variation segment $(S_4+S_5)$ are connected to each other by a non-specified segment that is not specified as the travel segment. Specifically, the control section 20 searches for the shortest route that connects between the branch location A and the post-variation segment $(S_4+S_5)$, and determines whether or not a non-specified segment, which is a road segment S that is not specified as the travel segment, is present on the shortest route. In addition, the branch location A is the end point of a travel segment that was last traveled in the period before the segment variation C, among intersections indicated in the map information 30a. In the case where it is not determined that the branch location A and the post-variation segment $(S_4+S_5)$ are connected to each other by a non-specified segment that is not specified as the travel segment, through the function of the travel information recording section 21b, the control section 20 executes the replacement recording processing. In FIG. 2C, the branch location A and the post-variation segment $(S_4+S_5)$ are directly connected to each other, and the branch location A and the post-variation segment $(S_4+S_5)$ are not connected to each other by a non-specified segment that is not specified as the travel segment.

In the replacement recording processing, through the function of the travel information recording section 21b, the control section 20 acquires a power integral value D to be recorded in the travel information DB 30b in association with the post-variation segment $(S_4+S_5)$, which is the travel segment after the segment variation C, on the basis of the power integral value D obtained after travel through the branch location A, of the power integral value D obtained before the segment variation C. Specifically, through the function of the travel information recording section 21b, the control section 20 acquires a power integral value D to be recorded in association with the post-variation segment $(S_4+S_5)$ by integrating the power integral value D obtained before the segment variation C and the power integral value D obtained when the vehicle travels in the post-variation segment $(S_4+S_5)$ after the segment variation C with each other.

As illustrated in FIG. 2D, the power integral value D is reset to zero at the branch location A. Therefore, after travel through the branch location A, the power integral value D obtained after travel through the branch location A is integrated. In addition, the power integral value D is integrated until travel in the travel segment is completed. Therefore, the power integral value D is integrated until travel in the post-variation segment $(S_4+S_5)$ is completed without being reset when the segment variation C occurs. That is, as illustrated in FIG. 2D, by integrating the power integral value D from the branch location A until travel in the post-variation segment $(S_4+S_5)$ is completed, it is possible to acquire a power integral value D obtained by substantially integrating the power integral value D obtained before the segment variation C and the power integral value D obtained when the vehicle travels in the post-variation segment $(S_4+S_5)$ after the segment variation C.

Recording of the power integral value D is executed at the timing when travel in the travel segment is completed. The replacement recording processing is also executed at the timing when the vehicle has traveled through the end point of the post-variation segment $(S_4+S_5)$. In the replacement recording processing, the control section 20 acquires the power integral value D recorded in the RAM at the timing when the vehicle has traveled through the end point of the post-variation segment $(S_4+S_5)$, and records the power integral value D in the travel information DB 30b in association with the post-variation segment $(S_4+S_5)$. In the case of FIG. 2D, the road segment S2 is specified as the travel segment immediately after travel through the branch location A.

(1-3) Individual Recording Processing

Next, the individual recording processing will be described. The individual recording processing is also executed at the timing when the vehicle has traveled through the end point of the post-variation segment $(S_4+S_5)$. Although the replacement recording processing is executed in the case where the branch location A and the post-variation segment $(S_4+S_5)$ are not connected to each other by a non-specified segment that is not specified as the travel segment as discussed above, the control section 20 executes the individual recording processing or the integrated recording processing in the case where the branch location A and the post-variation segment $(S_4+S_5)$ are connected to each other by a non-specified segment. That is, in the case where the branch location A and the post-variation segment $(S_4+S_5)$ are connected to each other by a non-specified segment, through the function of the travel information recording section 21b, the control section 20 switchably executes one of the individual recording processing, in which the power integral value D is recorded in association with each of the non-specified segment and the post-variation segment ($S_4+S_5$), and the integrated recording processing, in which the power integral value D is recorded in association with an integrated segment obtained by integrating the non-specified segment and the post-variation segment ($S_4+S_5$) with each other. Specifically, through the function of the travel information recording section 21b, the control section 20 executes the individual recording processing in the case where the end point of the non-specified segment is an intersection, and executes the integrated recording processing in the case where the end point of the non-specified segment is not an intersection.

FIGS. 2E and 2G each illustrate a case where the branch location A and the post-variation segment ($S_4+S_5$) are connected to each other by a non-specified segment $S_6$. In FIG. 2E, an end point B (double circle) of the non-specified segment $S_6$ is an intersection to which not only the non-specified segment $S_6$ and the post-variation segment ($S_4+S_5$) but also another road segment $S_7$ is connected. Thus, the individual recording processing is executed in the case of FIG. 2E. In FIG. 2G, on the other hand, only the non-specified segment $S_6$ and the post-variation segment ($S_4+S_5$) are connected to the end point B of the non-specified segment $S_6$, and therefore the end point B is not an intersection.

Through the function of the travel information recording section 21b, the control section 20 executes the individual recording processing in the case where the road type of the non-specified segment $S_6$ and the road type of the post-variation segment ($S_4+S_5$) are different from each other, and executes the integrated recording processing in the case where the road type of the non-specified segment $S_6$ and the road type of the post-variation segment ($S_4+S_5$) are identical to each other. That is, the control section 20 executes the individual recording processing, rather than the integrated recording processing, in the case where the road type of the non-specified segment $S_6$ and the road type of the post-variation segment ($S_4+S_5$) are different from each other, even in the case where the end point B of the non-specified segment is not an intersection. That is, the control section 20 executes the integrated recording processing in the case where the end point B of the non-specified segment $S_6$ is not an intersection and the road type of the non-specified segment $S_6$ and the road type of the post-variation segment are identical to each other. In FIG. 2G, it is assumed that both the road type of the non-specified segment $S_6$ and the road type of the post-variation segment ($S_4+S_5$) are general roads, and the integrated recording processing is executed in the case of FIG. 2G.

In the case where the branch location A and the post-variation segment are connected to each other by a non-specified segment $S_6$, through the function of the travel information recording section 21b, the control section 20 executes the individual recording processing in which the power integral value D is individually recorded in association with each of the non-specified segment $S_6$ and the post-variation segment. Specifically, in the case where the branch location A and the post-variation segment are connected to each other by a non-specified segment $S_6$ that is not specified as the travel segment, through the function of the travel information recording section 21b, the control section 20 acquires a power integral value D to be recorded in association with a road segment $S_6$ (a segment including at least the non-specified segment $S_6$) on the basis of the power integral value D obtained before the segment variation C.

FIG. 2F is a schematic diagram illustrating a power integral value D to be recorded in the individual recording processing. The individual recording processing is also executed at the timing when the vehicle completes travel in the post-variation segment ($S_4+S_5$). At the timing, the power integral value D integrated during a period after travel through the branch location A until travel in the post-variation segment ($S_4+S_5$) is completed has been recorded in the RAM, and the power integral value D obtained when the vehicle travels in the entirety of the non-specified segment $S_6$ and the post-variation segment ($S_4+S_5$) has been recorded.

Thus, in the individual recording processing, through the function of the travel information recording section 21b, the control section 20 acquires a power integral value D to be recorded in association with the non-specified segment $S_6$ and a power integral value D to be recorded in association with the post-variation segment ($S_4+S_5$) by distributing the power integral value D obtained after travel through the branch location A and before travel in the post-variation segment ($S_4+S_5$) is completed on the basis of the proportions of the segment lengths of the post-variation segment ($S_4+S_5$) and the non-specified segment $S_6$. As illustrated in FIG. 2F, the power integral value D integrated after travel through the branch location A and before travel in the post-variation segment ($S_4+S_5$) is completed can be acquired by acquiring the power integral value D recorded in the RAM when travel in the post-variation segment ($S_4+S_5$) is completed. Through the function of the travel information recording section 21b, the control section 20 references the link data in the map information 30a to acquire a segment length $L_6$ of the non-specified segment $S_6$ and a segment length ($L_4+L_5$) of the post-variation segment ($S_4+S_5$). Then, the control section 20 multiplies the power integral value D acquired from the RAM by a proportion $L_6/(L_4+L_5+L_6)$ to acquire a power integral value D to be associated with the non-specified segment $S_6$. On the other hand, the control section 20 multiplies the power integral value D acquired from the RAM by a proportion $(L_4+L_5)/(L_4+L_5+L_6)$ to acquire a power integral value D to be associated with the post-variation segment ($S_4+S_5$).

(1-4) Integrated Recording Processing

Next, the integrated recording processing will be described. The integrated recording processing is also executed at the timing when the vehicle has traveled through the end point of the post-variation segment ($S_4+S_5$). In the case where the branch location A and the post-variation segment ($S_4+S_5$) are connected to each other by a non-specified segment $S_6$, through the function of the travel information recording section 21b, the control section 20 executes the integrated recording processing in which travel information is recorded in association with an integrated segment ($S_4+S_5+S_6$) obtained by integrating the non-specified segment $S_6$ and the post-variation segment ($S_4+S_5$) with each other. Specifically, through the function of the travel information recording section 21b, the control section 20 acquires a power integral value D to be recorded in association with the integrated segment ($S_4+S_5+S_6$) by integrating the power integral value D obtained before the segment variation C and the power integral value D obtained when the vehicle travels in the post-variation segment ($S_4+S_5$) after the segment variation C with each other.

FIG. 2H is a schematic diagram illustrating a power integral value D to be recorded in the integrated recording processing. As illustrated in FIG. 2H, the power integral value D integrated after travel through the branch location A and before travel in the post-variation segment ($S_4+S_5$) is completed can be acquired by acquiring the power integral value D recorded in the RAM when travel in the post-variation segment ($S_4+S_5$) is completed. That is, the control section 20 can acquire, from the RAM, a power integral value D obtained by substantially integrating the power integral value D obtained in the non-specified segment $S_6$, and the power integral value D obtained in the post-variation segment ($S_4+S_5$) with each other. The integrated segment ($S_4+S_5+S_6$) is a road segment S obtained by integrating the non-specified segment $S_6$ and the post-variation segment ($S_4+S_5$) with each other. Therefore, the power integral value D recorded in the RAM may only be recorded in association with the integrated segment ($S_4+S_5+S_6$).

(1-5) Drive Assist

The drive assist section 21c is a module that causes the control section 20 to execute processing for setting energy distribution for each control segment on the basis of the power integral value D recorded in the travel information DB 30b. The energy distribution is the distribution of energy to be transferred from the internal combustion engine 49b and the motor 48 to the output shaft 49d, and adjusted by the gear mechanism 49c. The control segment is the unit of segments for which energy distribution is set. Through the function of the drive assist section 21c, the control section 20 sets a control segment by acquiring a planned travel route for the vehicle found using a route search technique known in the art and connecting a plurality of continuous road segments S on the planned travel route. In this event, the control section 20 does not connect road segments S of different road types to each other. Then, the control section 20 sets energy distribution for each control segment on the basis of the average value, the total value, or the like of the power integral values D associated with the road segments S composing the control segment. For example, the energy distribution for the internal combustion engine 49b is set to be larger for a control segment with a larger power integral value D. A table (not illustrated) that prescribes energy distribution corresponding to the average value, the total value, or the like of the power integral values D has been prepared in advance in the storage medium 30 for each road type. Thus, it is possible to set energy distribution that is suitable for the average value, the total value, or the like of the power integral values D for each of a highway and a general road.

In the embodiment described above, a travel segment specified by performing map matching over a long time and a long distance from travel through the branch location A has a higher degree of reliability than that of a travel segment specified immediately after travel through the branch location A. Thus, in the case where a segment variation C occurs after travel through the branch location A, the post-variation segment ($S_4+S_5$) which is specified after the segment variation C has a higher degree of reliability as a travel segment than that of a travel segment specified before the segment variation C. That is, it can be considered that before the segment variation C, the vehicle was traveling in the post-variation segment ($S_4+S_5$), which is the travel segment after the segment variation C, rather than the travel segment before the segment variation C. Thus, through the function of the travel information recording section 21b, the control section 20 can associate the power integral value D of the vehicle with an appropriate road segment by acquiring a power integral value D to be associated with the post-variation segment ($S_4+S_5$) on the basis of the power integral value D obtained before the segment variation C.

As illustrated in FIG. 2C, the post-variation segment ($S_4+S_5$) is composed of a portion (first portion $S_4$), in which the vehicle was traveling before the segment variation C, and a portion (second portion $S_5$), in which the vehicle was traveling after the segment variation C. The power integral value D obtained before the segment variation C means the power integral value D obtained in the first portion $S_4$. The power integral value D obtained when the vehicle travels in the post-variation segment ($S_4+S_5$) after the segment variation C means the power integral value D obtained in the second portion $S_5$. Thus, the power integral value D obtained in the entire post-variation segment ($S_4+S_5$) can be acquired by integrating the power integral value D obtained before the segment variation C (the power integral value D obtained in the first portion $S_4$) and the power integral value D obtained when the vehicle travels in the post-variation segment ($S_4+S_5$) after the segment variation C (the power integral value D obtained in the second portion $S_5$) with each other. As illustrated in FIG. 2D, the power integral value D is not reset to zero at the segment variation C. Therefore, a power integral value D obtained by substantially integrating the power integral value D obtained in the first portion $S_4$ and the power integral value D obtained in the second portion $S_5$ can be acquired by acquiring a power integral value D integrated after travel through the branch location A until travel in the post-variation segment ($S_4+S_5$) is completed.

It can be judged that before travel through the branch location A, the vehicle was traveling in the road segment $S_1$ from which branches were made. Therefore, the power integral value D obtained before travel through the branch location A, of the power integral value D obtained before the segment variation C, can be excluded from the power integral value D obtained in the post-variation segment ($S_4+S_5$). Thus, a power integral value D to be recorded in association with the post-variation segment ($S_4+S_5$) can be acquired on the basis of the power integral value D obtained after travel through the branch location A, of the power integral value D obtained before the segment variation C. As illustrated in FIG. 2D, the power integral value D is reset to zero during travel through the branch location A. Therefore, the power integral value D obtained before travel through the branch location A can be substantially excluded from the power integral value D obtained in the post-variation segment ($S_4+S_5$) by acquiring the power integral value D from the RAM at the timing when travel in the post-variation segment ($S_4+S_5$) is completed.

In addition, in the case where the branch location A and the post-variation segment ($S_4+S_5$) are connected to each other by a non-specified segment $S_6$ that is not specified as the travel segment, through the function of the travel information recording section 21b, the control section 20 acquires a power integral value D to be recorded in association with a segment including at least the non-specified segment $S_6$ on the basis of the power integral value D obtained before the segment variation C. In the embodiment, the segment including at least the non-specified segment $S_6$ is the road segment $S_6$ in the individual recording processing of FIG. 2F, and the integrated segment ($S_4+S_5+S_6$) in the integrated recording processing of FIG. 2H. In the case where the branch location A and the post-variation segment ($S_4+S_5$) are not directly connected to each other but a non-specified segment $S_6$ is present between the branch location A and the post-variation segment ($S_4+S_5$), it can be considered that the vehicle has entered the post-variation segment ($S_4+S_5$) from the branch location A by way of the non-specified segment $S_6$. That is, the vehicle traveled in the non-specified segment $S_6$ before the segment variation C, and therefore it can be considered that the power integral value D obtained before the segment variation C is the power integral value D obtained during travel in the segment including at least the non-specified segment $S_6$. Thus, the control section 20 can acquire a power integral value D to be associated with the segment including at least the non-specified segment $S_6$ on the basis of the power integral value D obtained before the segment variation C. In this way, an appropriate power integral value D can be acquired even for a segment including the non-specified segment $S_6$ which was not actually specified as the travel segment, which makes it possible to prevent a loss of the power integral value D obtained in the non-specified segment $S_6$.

In addition, a power integral value D can be acquired for each of the non-specified segment $S_6$ and the post-variation segment $(S_4+S_5)$ by executing the individual recording processing discussed above. Therefore, drive assist can be provided on the basis of the power integral value D even for a route (e.g. the road segments $S_1 \rightarrow S_6 \rightarrow S_7$ in FIG. 2E) that includes only the non-specified segment $S_6$, among the non-specified segment and the post-variation segment $(S_4+S_5)$, and a route (e.g. the road segments $S_7 \rightarrow S_4 \rightarrow S_5$ in FIG. 2E) that includes only the post-variation segment $(S_4+S_5)$. In the individual recording processing, by considering the proportions of the segment lengths of the post-variation segment $(S_4+S_5)$ and the non-specified segment $S_6$, a portion corresponding to the non-specified segment $S_6$ and a portion corresponding to the post-variation segment $(S_4+S_5)$ can be acquired from the power integral value D obtained after travel through the branch location and before travel in the post-variation segment $(S_4+S_5)$ is completed.

In the integrated recording processing discussed above, on the other hand, a power integral value D is not individually associated with each of the non-specified segment $S_6$ and the post-variation segment $(S_4+S_5)$. Therefore, the number of segments with which a power integral value D is associated can be suppressed. Thus, the storage capacity of the travel information DB 30b which stores the power integral value D can be reduced. In addition, processing for distributing the power integral value D obtained before the segment variation C to the non-specified segment $S_6$ and the post-variation segment $(S_4+S_5)$ can be dispensed with. In the integrated recording processing, in addition, a power integral value D obtained in the integrated segment can be acquired by integrating the power integral value D obtained before the segment variation C and the power integral value D obtained when the vehicle travels in the post-variation segment $(S_4+S_5)$ after the segment variation C with each other. As illustrated in FIG. 2H, the integrated segment $(S_4+S_5+S_6)$ is a road segment actually traveled by the vehicle after travel through the branch location A and before travel in the post-variation segment $(S_4+S_5)$ is completed. Therefore, a power integral value D to be recorded in association with the integrated segment $(S_4+S_5+S_6)$ can be acquired by acquiring, from the RAM, the power integral value D integrated after travel through the branch location A until travel in the post-variation segment $(S_4+S_5)$ is completed.

In the case where the end point B of the non-specified segment $S_6$ is an intersection, the vehicle can exit from the non-specified segment $S_6$ to a road segment S other than the post-variation segment $(S_4+S_5)$. That is, in the case where the end point B of the non-specified segment $S_6$ is an intersection, the vehicle may travel through a route that includes only the non-specified segment $S_6$, among the non-specified segment $S_6$ and the post-variation segment $(S_4+S_5)$. In such a situation, by individually associating a power integral value D with the non-specified segment $S_6$, drive assist can be provided on the basis of the power integral value D associated with the non-specified segment $S_6$ even in the case where a route that includes only the non-specified segment $S_6$ is formed.

In the case where the end point B of the non-specified segment $S_6$ is not an intersection, on the other hand, the vehicle can exit from the non-specified segment $S_6$ to only the post-variation segment $(S_4+S_5)$. That is, in the case where the end point of the non-specified segment $S_6$ is not an intersection, a route in which the vehicle inevitably travels in the post-variation segment $(S_4+S_5)$ after travel in the non-specified segment $S_6$ is formed, and the vehicle may not travel through a route that includes only the non-specified segment $S_6$. Thus, a power integral value D can be acquired for a route traveled by the vehicle by just associating a power integral value D with an integrated segment obtained by integrating the non-specified segment $S_6$ and the post-variation segment $(S_4+S_5)$ with each other, without individually associating a power integral value D with the non-specified segment $S_6$. Furthermore, by executing the individual recording processing in the case where the road type of the non-specified segment $S_6$ and the road type of the post-variation segment $(S_4+S_5)$ are different from each other, power integral values D can be grasped separately for segments of different road types. Therefore, road segments S of the same road type can be connected to each other.

(2) Travel Information Recording Processing

Figure 3:
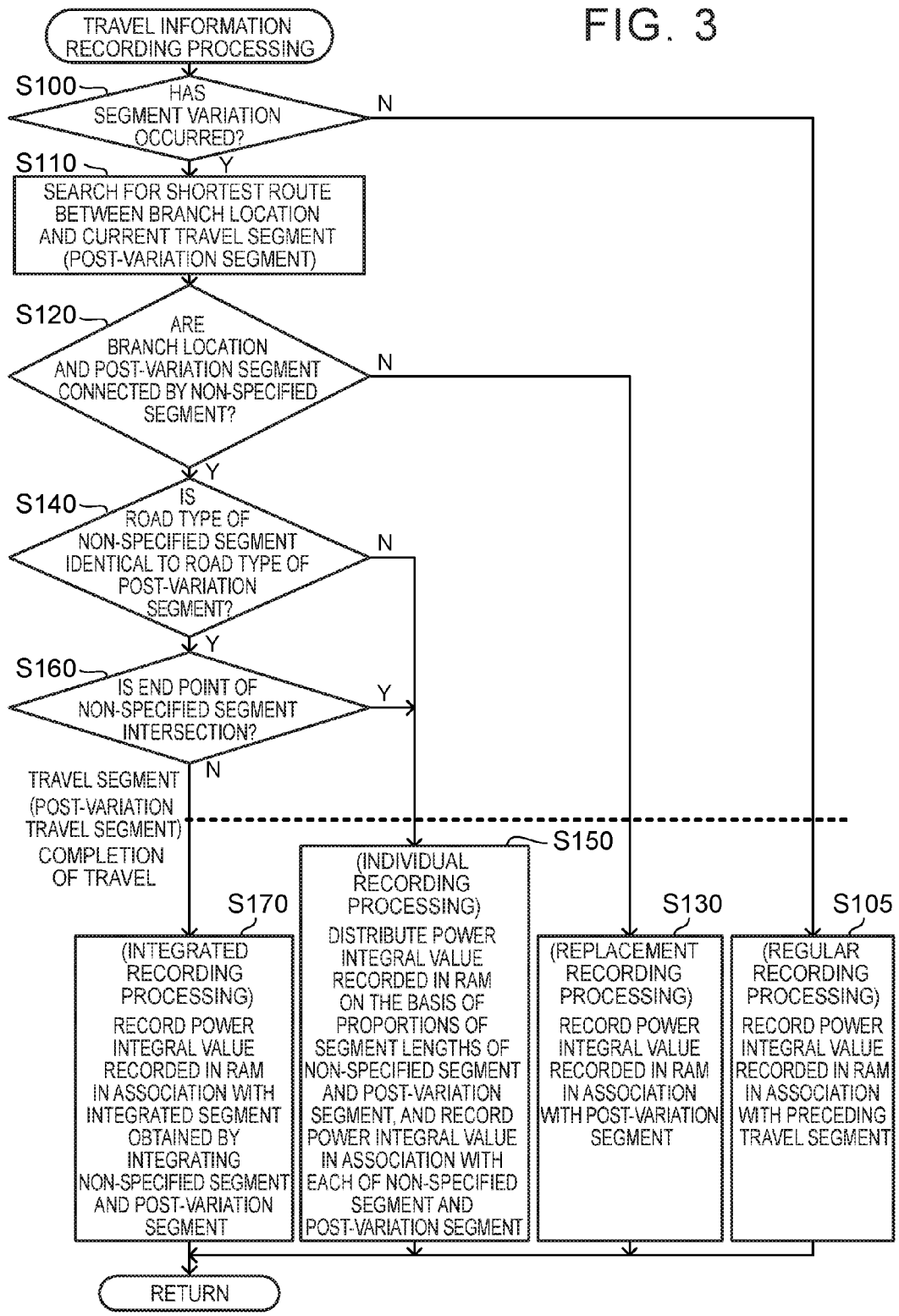
FIG. 3 is a flowchart illustrating travel information recording processing.

Next, travel information recording processing will be described in detail. FIG. 3 is a flowchart of the travel information recording processing. Through the function of the travel segment specifying section 21a, the control section 20 specifies the travel segment in which the vehicle is traveling at all times. First, through the function of the travel information recording section 21b, the control section 20 determines whether or not there has occurred a segment variation C, in which the travel segment is varied from one of a plurality of road segments S branched off from the branch location A (step S100). That is, the control section 20 determines whether or not the current position P of the vehicle specified in the travel segment has discontinuously transitioned, and determines that there has occurred a segment variation C in the case where the current position P has discontinuously transitioned.

In the case where travel in the travel segment is completed while it is not determined that a segment variation C has occurred (step S100: N), through the function of the travel information recording section 21b, the control section 20 executes the regular recording processing (step S105). As illustrated in FIGS. 2A and 2B, in the case where the road segment $S_2$ is specified as the travel segment, the control section 20 records the power integral value D recorded in the RAM as it is in the travel information DB 30b in association with the road segment $S_2$.

In the case where it is determined that a segment variation C has occurred, on the other hand, through the function of the travel information recording section 21b, the control section 20 searches for the shortest route between the branch location A and the current travel segment (step S110). The current travel segment is the travel segment specified after the segment variation C, that is, the post-variation segment $(S_4+S_5)$. Next, through the function of the travel information recording section 21b, the control section 20 determines whether or not the branch location A and the post-variation segment $(S_4+S_5)$ are connected to each other by a non-specified segment that is not specified as the travel segment (step S120). That is, the control section 20 determines whether or not a non-specified segment is present on the shortest route between the branch location A and the post-variation segment $(S_4+S_5)$. In the case of FIG. 2C, a non-specified segment is not present on the shortest route between the branch location A and the post-variation segment ($S_4+S_5$). In the case of FIGS. 2E and 2G, a non-specified segment $S_6$ is present on the shortest route between the branch location A and the post-variation segment ($S_4+S_5$).

In the case where travel in the post-variation segment ($S_4+S_5$) is completed while it is not determined that the branch location A and the post-variation segment ($S_4+S_5$) are connected to each other by a non-specified segment $S_6$ (step S120: N), through the function of the travel information recording section 21b, the control section 20 executes the replacement recording processing (step S130). That is, as illustrated in FIGS. 2C and 2D, through the function of the travel information recording section 21b, the control section 20 records the power integral value D (the power integral value D recorded in the RAM) integrated during a period after travel through the branch location A until travel in the post-variation segment ($S_4+S_5$) is completed in association with the post-variation segment ($S_4+S_5$). The power integral value D recorded in the RAM means a power integral value D obtained by integrating the power integral value D obtained before the segment variation C and the power integral value D obtained when the vehicle travels in the post-variation segment ($S_4+S_5$) after the segment variation C.

In the case where it is determined that the branch location A and the post-variation segment ($S_4+S_5$) are connected to each other by a non-specified segment $S_6$ (step S120: Y), through the function of the travel information recording section 21b, the control section 20 determines whether or not the road type of the non-specified segment $S_6$ and the road type of the post-variation segment ($S_4+S_5$) are identical to each other (step S140). The number of the non-specified segment $S_6$ is not limited to one, and may be two or more. In the case where there are a plurality of non-specified segments $S_6$, the control section 20 may only determine whether or not the road type of all the non-specified segments $S_6$ and the road type of the post-variation segment ($S_4+S_5$) are identical to each other.

In the case where travel in the post-variation segment ($S_4+S_5$) is completed while it is not determined that the road type of the non-specified segment $S_6$ and the road type of the post-variation segment ($S_4+S_5$) are identical to each other (step S140: N), through the function of the travel information recording section 21b, the control section 20 executes the individual recording processing (step S150). That is, as illustrated in FIGS. 2E and 2F, through the function of the travel information recording section 21b, the control section 20 acquires a power integral value D to be recorded in association with the non-specified segment $S_6$ and a power integral value D to be recorded in association with the post-variation segment ($S_4+S_5$) by distributing the power integral value D (the power integral value D recorded in the RAM) integrated during a period after travel through the branch location A until travel in the post-variation segment ($S_4+S_5$) is completed on the basis of the proportions of the segment lengths of the post-variation segment ($S_4+S_5$) and the non-specified segment $S_6$. Specifically, the control section 20 multiplies the power integral value D acquired from the RAM by the proportion $L_6/(L_4+L_5+L_6)$ of the segment length to acquire a power integral value D to be associated with the non-specified segment $S_6$. On the other hand, the control section 20 multiplies the power integral value D acquired from the RAM by the proportion $(L_4+L_5)/(L_4+L_5+L_6)$ of the segment length to acquire a power integral value D to be associated with the post-variation segment ($S_4+S_5$).

Then, the control section 20 records the power integral value D in the travel information DB 30b in association with each of the post-variation segment ($S_4+S_5$) and the non-specified segment $S_6$. In the case where a plurality of non-specified segments $S_6$ are present, the control section 20 may only acquire a power integral value D to be associated with each of the non-specified segments $S_6$ on the basis of the proportion of the segment length of each of the non-specified segments $S_6$.

In the case where it is determined that the road type of the non-specified segment $S_6$ and the road type of the post-variation segment ($S_4+S_5$) are identical to each other (step S140: Y), through the function of the travel information recording section 21b, the control section 20 determines whether or not the end point B of the non-specified segment $S_6$ is an intersection (step S160). The control section 20 determines that the end point B of the non-specified segment $S_6$ is an intersection in the case where a road segment $S_7$ other than the non-specified segment $S_6$ and the post-variation segment ($S_4+S_5$) is connected to the end point B of the non-specified segment $S_6$ as illustrated in FIG. 2E. In the case where a plurality of non-specified segments $S_6$ are present, the control section 20 determines that the end point B of the non-specified segment $S_6$ is an intersection in the case where the end point B of at least one of the non-specified segments $S_6$ is an intersection. In the case where it is determined that the end point B of the non-specified segment $S_6$ is an intersection (step S160: Y), through the function of the travel information recording section 21b, the control section 20 executes the individual recording processing (step S150).

In the case where it is not determined that the end point B of the non-specified segment $S_6$ is an intersection (step S160: N), on the other hand, through the function of the travel information recording section 21b, the control section 20 executes the integrated recording processing (step S170). That is, as illustrated in FIGS. 2G and 2H, through the function of the travel information recording section 21b, the control section 20 acquires the power integral value D (the power integral value D recorded in the RAM) integrated during a period after travel through the branch location A until travel in the post-variation segment ($S_4+S_5$) is completed as the power integral value D to be recorded in association with the integrated segment ($S_4+S_5+S_6$) which is obtained by connecting the non-specified segment $S_6$ and the post-variation segment ($S_4+S_5$) to each other. Then, the control section 20 records the power integral value D recorded in the RAM in the travel information DB 30b in association with the integrated segment ($S_4+S_5+S_6$). The power integral value D recorded in the RAM means a power integral value D obtained by integrating the power integral value D obtained in the post-variation segment ($S_4+S_5$) and the power integral value D obtained in the non-specified segment $S_6$ with each other. The control section 20 may delete the post-variation segment ($S_4+S_5$) and the non-specified segment $S_6$ from the link data in the map information 30a, and newly define an integrated segment ($S_4+S_5+S_6$).

(3) Other Embodiments

In the case where a segment variation C occurs and the post-variation segment ($S_4+S_5$) is not a road segment S on the planned travel route found in advance, through the function of the travel information recording section 21b, the control section 20 may acquire a power integral value D to be recorded in association with the post-variation segment ($S_4+S_5$) on the basis of the power integral value D obtained before the segment variation C. Consequently, the power integral value D can also be recorded in association with the post-variation segment ($S_4+S_5$) that is not present on the planned travel route. That is, the power integral value D can be recorded in association with a road segment S erroneously traveled by the driver with guidance on the planned travel route provided. The control section 20 can recognize that the vehicle is not traveling on the planned travel route on the basis of the fact that the post-variation segment ($S_4+S_5$) is not a road segment on the planned travel route found in advance. Thus, in a configuration in which a new search (re-route search) is made for a planned travel route from the current travel segment as the departure location to the destination location in the case where the vehicle is not traveling on the planned travel route, the control section 20 may be triggered by the fact that the re-route search has been made to execute one of the replacement recording processing, the integrated recording processing, and the individual recording processing.

In the embodiment, one of the integrated recording processing and the individual recording processing is switchably executed. However, one of the integrated recording processing and the individual recording processing may be executed at all times in the case where it is determined that the branch location A and the post-variation segment ($S_4+S_5$) are connected to each other by a non-specified segment $S_6$ (step S120: Y in FIG. 3). In addition, the condition under which switching is made between the integrated recording processing and the individual recording processing is not limited to the condition employed in the embodiment. For example, switching may be made between the integrated recording processing and the individual recording processing on the basis of the frequency of travel of the vehicle, the remaining storage capacity of the storage medium 30, or the like.

In the embodiment, the power integral value D is integrated, without resetting the power integral value D, after travel through the branch location A until travel in the post-variation segment ($S_4+S_5$) is completed. However, the power integral value D may be reset in the case where a segment variation C has occurred. In this case, in the replacement recording processing, the control section 20 may acquire a power integral value D to be associated with the post-variation segment ($S_4+S_5$) by totaling (integrating) the power integral value D integrated after travel through the branch location A until a segment variation C occurs and the power integral value D integrated after the segment variation C occurs until travel in the post-variation segment ($S_4+S_5$) is completed. In addition, an average value (such as the average value of consumed power) of values that indicate the travel state in the travel segment, rather than an integral value such as the power integral value D, may be recorded as the travel information. In this case, an average value for the non-specified segment $S_6$ and an average value for the post-variation segment ($S_4+S_5$) may be integrated with each other by calculating weighted average values based on the proportions of the segment lengths.

The travel segment specifying unit may only specify a travel segment that is a road segment in which the vehicle is traveling. A variety of techniques for specifying a travel segment are conceivable. For example, the travel segment specifying unit may acquire, for each road segment, a degree of confidence that matches the degree of coincidence between the position, the orientation, or the track of travel (time-series positions) of the vehicle and the position or the shape of the road segment, and specify a road segment with a degree of confidence that meets a predetermined condition as the travel segment. For example, a road segment with the largest degree of confidence may be specified as the travel segment, or a road segment with a degree of confidence that is equal to or more than a threshold may be specified as the travel segment. The position, the orientation, or the track of travel of the vehicle may be acquired on the basis of GPS signals, may be specified by autonomous navigation, or may be specified by a combination of GPS signals and autonomous navigation.

Because of the nature of map matching discussed above, a segment variation tends to occur after travel through a branch location in the case where road segments branched off from the branch location are similar to each other in shape or position. That is, in the case where road segments branched off from the branch location are similar to each other in shape or position, the degrees of confidence of the road segments are approximate to each other. Therefore, there tends to be a variation from a state in which the degree of confidence of a certain road segment meets a predetermined condition to a state in which the degree of confidence of another road segment meets the predetermined condition. In general, there tends to occur a segment variation at a narrow-angle branch location at which the angle between a plurality of road segments branched off from a branch location is small. The post-variation segment which is the travel segment after a segment variation may be a road segment that can be entered after travel through the branch location, may be a road segment directly connected to the branch location, or may be a road segment connected to a road segment directly connected to the branch location.

Furthermore, in the case where with a configuration for specifying the current position of the vehicle on the travel segment, the current position discontinuously transitions at the timing when a segment variation occurs. Thus, the travel information recorder may consider that a segment variation has occurred in the case where the current position of the vehicle has discontinuously transitioned. In addition, in the case where a travel segment is adequately specified on the travel route for the vehicle, a road segment connected to the end point of a certain travel segment is specified as the next travel segment after travel to the end point of the certain travel segment. Thus, it may considered that a segment variation has occurred in the case where another road segment is specified as the travel segment before travel to the end point of the certain travel segment (to a location a predetermined distance or more before the end point).

The travel information recorder may only record travel information on the vehicle obtained in the travel segment. The travel information may be any information that indicates the travel state of the vehicle. For example, the travel information may be information indicating the motion state (vehicle speed, acceleration, deceleration, angular speed, angular acceleration, and orientation of travel) of the vehicle, may be information indicating the drive operation state (pedal operation amount, steering angle, and shift speed) of the vehicle, may be information indicating the energy state (remaining power amount, remaining fuel, power efficiency, and fuel efficiency) of the vehicle, or may be environment information on the vehicle such as the weather and the degree of congestion. The travel information recorder may only record travel information in a storage medium, and may record travel information in a local storage medium, or may record travel information in a storage medium provided to an external server or the like via communication. Furthermore, the travel information may be information for calculating a statistical value for each road segment, or may be information for use for drive assist. Examples of the travel information for use for drive assist include information for controlling the vehicle, information for providing guidance to the driver, information for searching for a planned travel route, information for displaying a map, and so forth.

In the case where a segment variation has occurred, the travel information recorder may only acquire travel information obtained in the post-variation segment on the basis of travel information obtained before the segment variation, and may only acquire travel information obtained in the post-variation segment on the basis of at least a part of travel information obtained before the segment variation. That is, the travel information recorder may acquire a portion of travel information obtained before the segment variation corresponding to the post-variation segment, and associate the portion corresponding to the post-variation segment with the post-variation segment.

In addition, the travel information recorder may acquire travel information to be recorded in association with the post-variation segment by integrating travel information obtained before the segment variation and travel information obtained when the vehicle travels in the post-variation segment after the segment variation with each other. The post-variation segment is composed of a portion (first portion), in which the vehicle was traveling before the segment variation, and a portion (second portion), in which the vehicle was traveling after the segment variation. The travel information obtained before the segment variation includes travel information obtained in the first portion. The travel information obtained when the vehicle travels in the post-variation segment after the segment variation means travel information obtained in the second portion.

Thus, travel information obtained in the entire post-variation segment can be acquired by integrating travel information obtained before the segment variation (travel information obtained in the first portion) and travel information obtained when the vehicle travels in the post-variation segment after the segment variation (travel information obtained in the second portion) with each other.

It can be judged that before travel through the branch location, the vehicle was traveling in the road segment from which branches were made. Therefore, travel information obtained before travel through the branch location, of the travel information obtained before the segment variation, can be excluded from travel information obtained in the post-variation segment. Thus, travel information to be recorded in association with the post-variation segment can be acquired on the basis of the travel information obtained after travel through the branch location, of the travel information obtained before the segment variation.

In the case where the branch location and the post-variation segment are not directly connected to each other but a non-specified segment is present between the branch location and the post-variation segment, it can be considered that the vehicle has entered the post-variation segment from the branch location by way of the non-specified segment. That is, the vehicle traveled in the non-specified segment before the segment variation, and therefore it can be considered that the travel information obtained before the segment variation is the travel information obtained during travel in the segment including at least the non-specified segment. Thus, the travel information recorder can acquire travel information to be associated with the segment including at least the non-specified segment on the basis of the travel information obtained before the segment variation. In this way, appropriate travel information can be acquired even for a segment including the non-specified segment which was not actually specified as the travel segment, which makes it possible to prevent a loss of the travel information obtained in the non-specified segment.

Furthermore, in the case where the branch location and the post-variation segment are connected to each other by the non-specified segment, the travel information recorder may execute individual recording processing in which the travel information is individually recorded in association with each of the non-specified segment and the post-variation segment. If the individual recording processing is executed in this way, travel information can be acquired for each of the non-specified segment and the post-variation segment. Therefore, drive assist can be provided on the basis of the travel information even for a route that includes only the non-specified segment, among the non-specified segment and the post-variation segment, and a route that includes only the post-variation segment.

In addition, in the case where the branch location and the post-variation segment are connected to each other by the non-specified segment, the travel information recorder may execute integrated recording processing in which the travel information is recorded in association with an integrated segment obtained by integrating the non-specified segment and the post-variation segment with each other. Travel information is not individually associated with each of the non-specified segment and the post-variation segment. Therefore, the number of segments with which travel information is associated can be suppressed. Thus, the storage capacity for storing the travel information can be reduced. In addition, processing for distributing the travel information obtained before the segment variation to the non-specified segment and the post-variation segment can be dispensed with.

Furthermore, one of the individual recording processing and the integrated recording processing discussed above may be switchably executed. For example, the individual recording processing may be executed in the case where the end point of the non-specified segment is an intersection, and the integrated recording processing may be executed in the case where the end point of the non-specified segment is not an intersection. The intersection is a location from which the vehicle can exit to a plurality of road segments in the case where the vehicle enters the intersection from a certain road segment. In the case where the end point of a non-specified segment is an intersection, the vehicle can exit from the non-specified segment to a road segment other than the post-variation segment. That is, in the case where the end point of the non-specified segment is an intersection, the vehicle may travel through a route that includes only the non-specified segment, among the non-specified segment and the post-variation segment. In such a situation, by individually associating the travel information with the non-specified segment, drive assist can be provided on the basis of the travel information associated with the non-specified segment even in the case where a route that includes only the non-specified segment is formed.

In the case where the end point of a non-specified segment is not an intersection, on the other hand, the vehicle can exit from the non-specified segment to only the post-variation segment. That is, in the case where the end point of the non-specified segment is not an intersection, a route in which the vehicle inevitably travels in the post-variation segment after travel in the non-specified segment is formed, and the vehicle may not travel through a route that includes only the non-specified segment. Thus, travel information can be acquired for a route traveled by the vehicle by just associating travel information with an integrated segment obtained by integrating the non-specified segment and the post-variation segment with each other, without individually associating travel information with the non-specified segment.

Furthermore, the travel information recorder may execute the individual recording processing in the case where the road type of the non-specified segment and the road type of the post-variation segment are different from each other, and execute the integrated recording processing in the case where the road type of the non-specified segment and the road type of the post-variation segment are identical to each other. By executing the individual recording processing in the case where the road type of the non-specified segment and the road type of the post-variation segment are different from each other, travel information can be grasped separately for segments of different road types. Therefore, drive assist can be provided for each of the road types. The road types may be types of roads distinguished on the basis of the vehicle speed, may be types of roads distinguished on the basis of whether the road is a toll road or a free road, or may be types of roads distinguished on the basis of the administrator of the road. Specific examples of the road types include a highway, a national road, a prefectural road, a principal regional road, a general arterial road, a narrow street, and so forth. The individual recording processing may be executed in the case where the road type of the non-specified segment and the road type of the post-variation segment are different from each other.

Furthermore, the travel information recorder may acquire the travel information to be recorded in association with the non-specified segment and the travel information to be recorded in association with the post-variation segment by distributing the travel information obtained after travel through the branch location and before travel in the post-variation segment is completed on the basis of proportions of segment lengths of the post-variation segment and the non-specified segment. That is, by considering the proportions of the segment lengths of the post-variation segment and the non-specified segment, a portion corresponding to the non-specified segment and a portion corresponding to the post-variation segment can be acquired from the travel information obtained after travel through the branch location and before travel in the post-variation segment is completed.

In addition, in the integrated recording processing, the travel information recorder may acquire travel information obtained after travel through the branch location and before travel in the post-variation segment is completed as travel information to be recorded in association with the integrated segment. The integrated segment means the entire segment traveled after travel through the branch location and before travel in the post-variation segment is completed. Therefore, travel information obtained after travel through the branch location and before travel in the post-variation segment is completed can be associated with the integrated segment.

Furthermore, in the case where the segment variation has occurred and the post-variation segment is not a road segment on a planned travel route found in advance, the travel information recorder may acquire the travel information to be recorded in association with the post-variation segment on the basis of the travel information obtained before the segment variation. Consequently, the travel information can also be recorded in association with the post-variation segment that is not present on the planned travel route.

Furthermore, the technique for recording travel information in association with a post-variation segment as in the present disclosure can also be implemented as a program or a method. In addition, it can be assumed that the system, program, and method described above are implemented as a single device, implemented by a plurality of devices, or implemented utilizing parts that are common to various portions provided in the vehicle, and the system, program, and method include a variety of aspects. For example, a navigation system, method, and program that include the device described above can be provided. Various changes may be made as appropriate. For example, some units may be implemented using software, and the others may be implemented using hardware. Furthermore, the present disclosure may be implemented as a storage medium for a program that controls the system. As a matter of course, the storage medium for the software may totally equally be a magnetic storage medium, a magneto-optical storage medium, or any storage medium that may be developed in the future.

DESCRIPTION OF THE REFERENCE NUMERALS

10 NAVIGATION SYSTEM
20 CONTROL SECTION
21 TRAVEL INFORMATION RECORDING PROGRAM
21a TRAVEL SEGMENT SPECIFYING SECTION
21b TRAVEL INFORMATION RECORDING SECTION
21c DRIVE ASSIST SECTION
30 STORAGE MEDIUM
30a MAP INFORMATION
30b TRAVEL INFORMATION DB
41 GPS RECEPTION SECTION
42 VEHICLE SPEED SENSOR
43 GYRO SENSOR
44 USER I/F SECTION
48 MOTOR
49a BATTERY
49b INTERNAL COMBUSTION ENGINE
49c GEAR MECHANISM
49d OUTPUT SHAFT
A BRANCH LOCATION
B END POINT
C SEGMENT VARIATION

The invention claimed is:

1. A travel information recording system comprising:
a position determining device configured to obtain a current position of a vehicle;
a memory operable to store computer program code;
a computer processor operable to acquire and execute the computer program code;
travel segment specifying code executable by said computer processor for specifying a travel segment that is a road segment in which the vehicle is traveling based on the current position of the vehicle; and
travel information recorder for recording travel information of the vehicle obtained during travel in the travel segment in association with the travel segment in a storage medium, wherein
in the case where there occurs a segment variation in which the travel segment is varied from one of a plurality of road segments branched off from a branch location in which the vehicle is traveling,
the travel information recorder acquires the travel information to be recorded in association with a post-variation segment, which is the travel segment after the segment variation, on the basis of the travel information obtained before the segment variation, and
wherein in the case where the branch location and the post-variation segment are connected to each other by a non-specified segment, which is acquired as a shortest route connecting the branch location and the post-variation segment, that is not specified as the travel segment, the travel information recorder acquires the travel information to be recorded in association with a segment including at least the non-specified segment on the basis of the travel information obtained before the segment variation, and wherein in the case where the branch location and the post-variation segment are connected to each other by the non-specified segment, the travel information recorder switchably executes one of individual recording processing, in which the travel information is individually recorded in association with each of the non-specified segment and the post-variation segment, and integrated recording processing, in which the travel information is recorded in association with an integrated segment obtained by integrating the non-specified segment and the post-variation segment with each other;

the individual recording processing is executed in the case where an end point of the non-specified segment is an intersection; and the integrated recording processing is executed in the case where the end point of the non-specified segment is not an intersection.

2. The travel information recording system according to claim 1, wherein
the travel information recorder acquires the travel information to be recorded in association with the post-variation segment by integrating the travel information obtained before the segment variation and the travel information obtained when the vehicle travels in the post-variation segment after the segment variation with each other.

3. The travel information recording system according to claim 1, wherein
the travel information recorder acquires the travel information to be recorded in association with the post-variation segment on the basis of the travel information obtained after travel through the branch location, of the travel information obtained before the segment variation.

4. The travel information recording system according to claim 1, wherein
in the case where the branch location and the post-variation segment are connected to each other by the non-specified segment,
the travel information recorder executes individual recording processing in which the travel information is individually recorded in association with each of the non-specified segment and the post-variation segment.

5. The travel information recording system according to claim 4, wherein
in the individual recording processing, the travel information recorder acquires the travel information to be recorded in association with the non-specified segment and the travel information to be recorded in association with the post-variation segment by distributing the travel information obtained after travel through the branch location and before travel in the post-variation segment is completed on the basis of proportions of segment lengths of the post-variation segment and the non-specified segment.

6. The travel information recording system according to claim 1, wherein
in the case where the branch location and the post-variation segment are connected to each other by the non-specified segment,
the travel information recorder executes integrated recording processing in which the travel information is recorded in association with an integrated segment obtained by integrating the non-specified segment and the post-variation segment with each other.

7. The travel information recording system according to claim 6, wherein
in the integrated recording processing, the travel information recorder acquires the travel information obtained after travel through the branch location and before travel in the post-variation segment is completed as the travel information to be recorded in association with the integrated segment.

8. The travel information recording system according to claim 1, wherein
in the case where the branch location and the post-variation segment are connected to each other by the non-specified segment,
the travel information recorder switchably executes one of individual recording processing, in which the travel information is individually recorded in association with each of the non-specified segment and the post-variation segment, and integrated recording processing, in which the travel information is recorded in association with an integrated segment obtained by integrating the non-specified segment and the post-variation segment with each other;
the individual recording processing is executed in the case where a road type of the non-specified segment and a road type of the post-variation segment are different from each other; and
the integrated recording processing is executed in the case where the road type of the non-specified segment and the road type of the post-variation segment are identical to each other.

9. The travel information recording system according to claim 1, wherein
the travel information is information indicating a motion state of the vehicle.

10. The travel information recording system according to claim 1, wherein
the travel information is information indicating a drive operation state of the vehicle.

11. The travel information recording system according to claim 1, wherein
the travel information is information indicating an energy state of the vehicle.

12. The travel information recording system according to claim 1, wherein
the travel information is environment information on the vehicle.

13. A travel information recording method for causing a computer to perform:
a travel segment specifying step of specifying a travel segment that is a road segment in which a vehicle is traveling; and
a travel information recording step of recording travel information of the vehicle obtained during travel in the travel segment in association with the travel segment in a storage medium, wherein the travel information recording step includes, in the case where there occurs a segment variation in which the travel segment is varied from one of a plurality of road segments branched off from a branch location in which the vehicle is traveling, acquiring the travel information to be recorded in association with a post-variation segment, which is the travel segment after the segment variation, on the basis of the travel information obtained before the segment variation, and the travel information recording step includes, in the case where the branch location and the post-variation segment are connected to each other by a non-specified segment, which is acquired as a shortest route connecting the branch location and the post-variation segment, that is not specified as the travel segment, acquiring the travel information to be recorded in association with a segment including at least the non-specified segment on the basis of the travel information obtained before the segment variation, and the travel information recording step includes, in the case where the branch location and the post-variation segment are connected to each other by the non-specified segment, switchably executing one of individual recording processing, in which the travel information is individually recorded in association with each of the non-specified segment and the post-variation segment, and integrated recording processing, in which the travel information is recorded in association with an integrated segment obtained by integrating the non-specified segment and the post-variation segment with each other;

the individual recording processing is executed in the case where an end point of the non-specified segment is an intersection; and the integrated recording processing is executed in the case where the end point of the non-specified segment is not an intersection.

14. A non-transitory computer medium storing a travel information recording program that causes a computer to implement:

a travel segment specifying function of specifying a travel segment that is a road segment in which a vehicle is traveling; and a travel information recording function of recording travel information of the vehicle obtained during travel in the travel segment in association with the travel segment in a storage medium, wherein in the case where there occurs a segment variation in which the travel segment is varied from one of a plurality of road segments branched off from a branch location in which the vehicle is traveling, the travel information recording function causes the computer to acquire the travel information to be recorded in association with a post-variation segment, which is the travel segment after the segment variation, on the basis of the travel information obtained before the segment variation, and the travel information recording function includes, in the case where the branch location and the post-variation segment are connected to each other by a non-specified segment, which is acquired as a shortest route connecting the branch location and the post-variation segment, that is not specified as the travel segment, acquiring the travel information to be recorded in association with a segment including at least the non-specified segment on the basis of the travel information obtained before the segment variation, and the travel information recording function includes, in the case where the branch location and the post-variation segment are connected to each other by the non-specified segment, switchably executing one of individual recording processing, in which the travel information is individually recorded in association with each of the non-specified segment and the post-variation segment, and integrated recording processing, in which the travel information is recorded in association with an integrated segment obtained by integrating the non-specified segment and the post-variation segment with each other;

the individual recording processing is executed in the case where an end point of the non-specified segment is an intersection; and the integrated recording processing is executed in the case where the end point of the non-specified segment is not an intersection.

\* \* \* \* \*